Dec. 30, 1969 P. R. PRETZER 3,486,290
PACKING METHOD AND APPARATUS
Filed Nov. 30, 1967 11 Sheets-Sheet 1

INVENTOR.
PAUL R. PRETZER
BY
*Fay, Sharpe & Mulholland*
ATTORNEYS

INVENTOR.
PAUL R. PRETZER

Dec. 30, 1969   P. R. PRETZER   3,486,290
PACKING METHOD AND APPARATUS
Filed Nov. 30, 1967   11 Sheets-Sheet 3
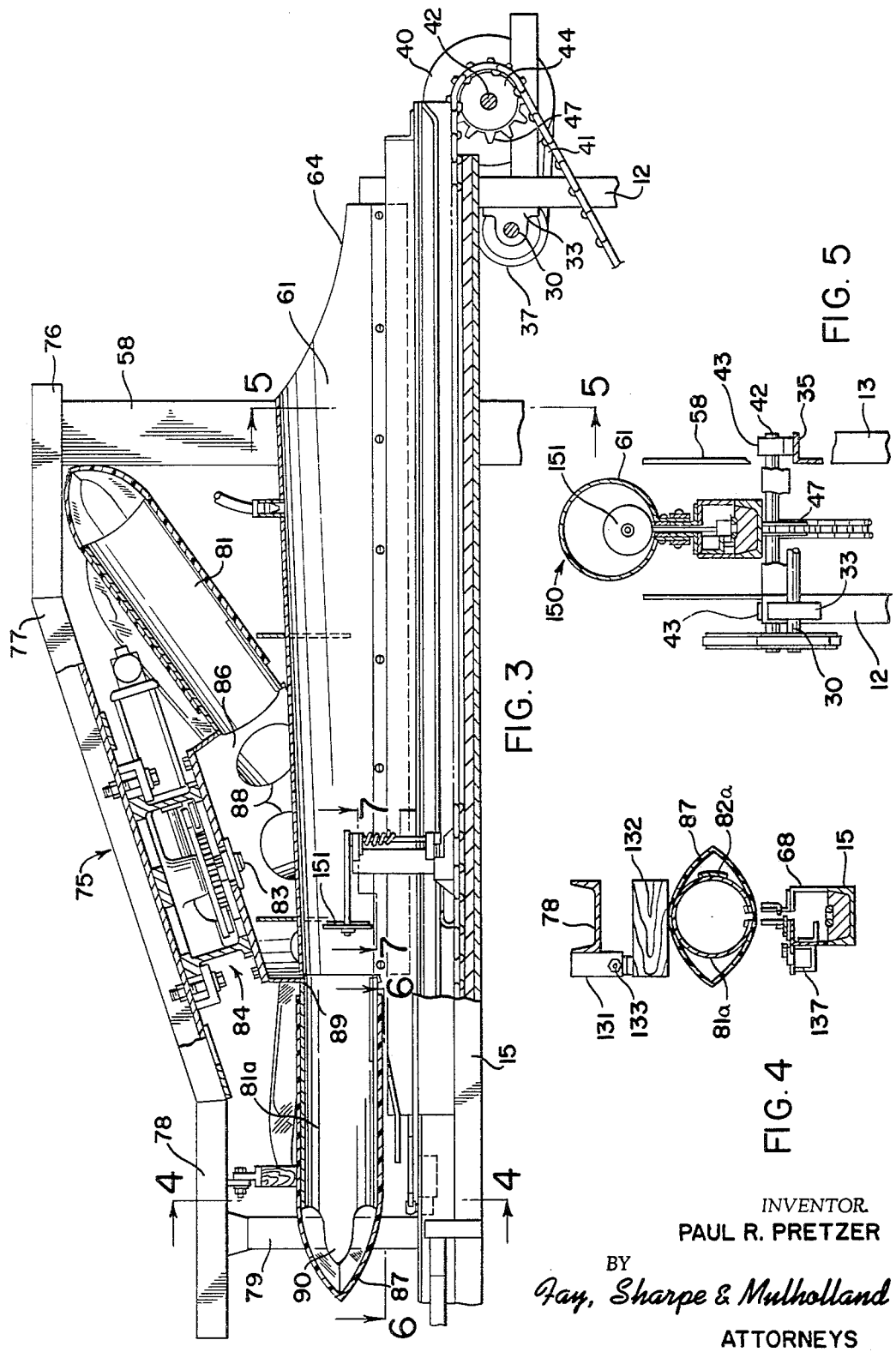
INVENTOR.
PAUL R. PRETZER
BY
Fay, Sharpe & Mulholland
ATTORNEYS Dec. 30, 1969 P. R. PRETZER 3,486,290
PACKING METHOD AND APPARATUS
Filed Nov. 30, 1967 11 Sheets-Sheet 4

INVENTOR.
PAUL R. PRETZER
BY
*Fay, Sharpe & Mulholland*
ATTORNEYS

Dec. 30, 1969 P. R. PRETZER 3,486,290
PACKING METHOD AND APPARATUS
Filed Nov. 30, 1967 11 Sheets-Sheet 5

INVENTOR.
PAUL R. PRETZER
BY
Fay, Sharpe & Mulholland
ATTORNEYS

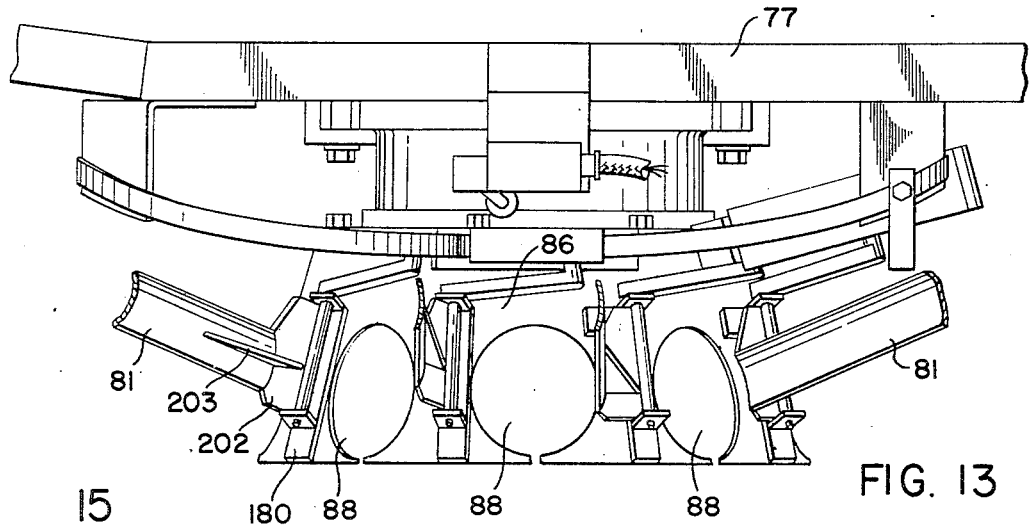
FIG. 13
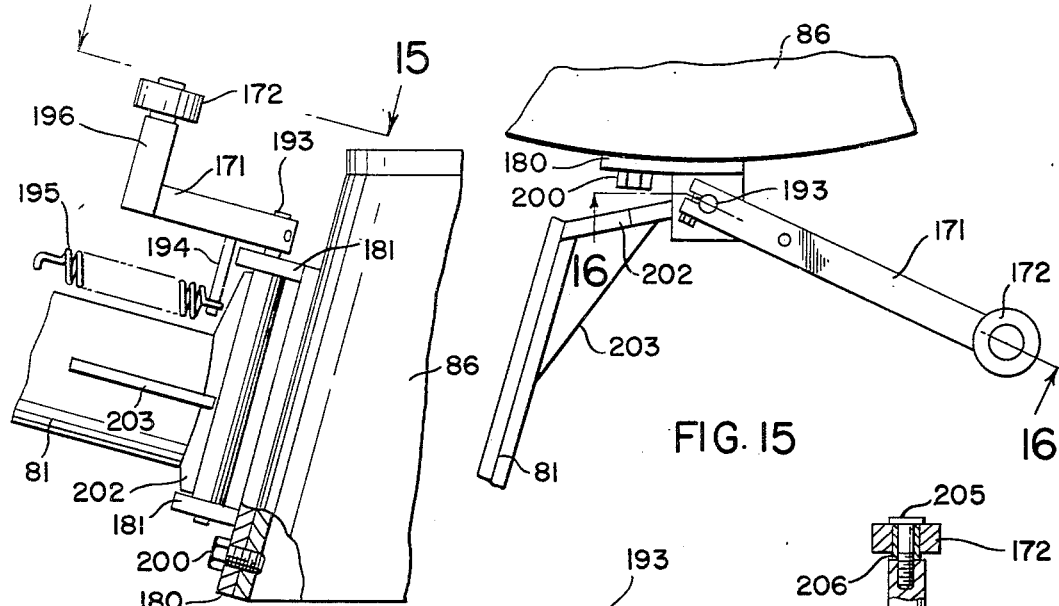
FIG. 14
FIG. 15
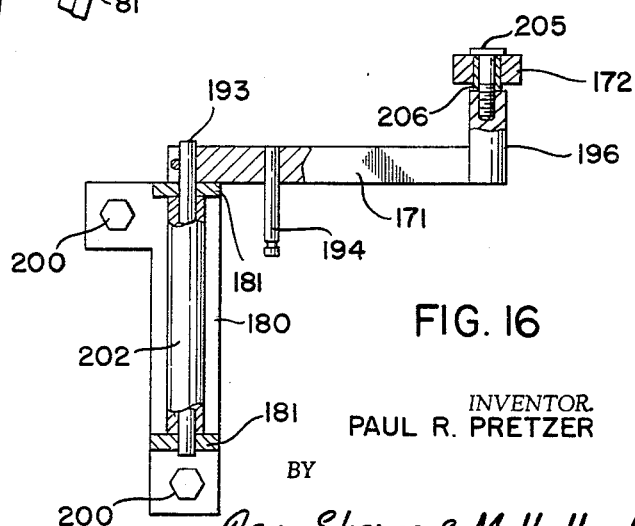
FIG. 16
INVENTOR.
PAUL R. PRETZER
BY
*Fay, Sharpe & Mulholland*
ATTORNEYS

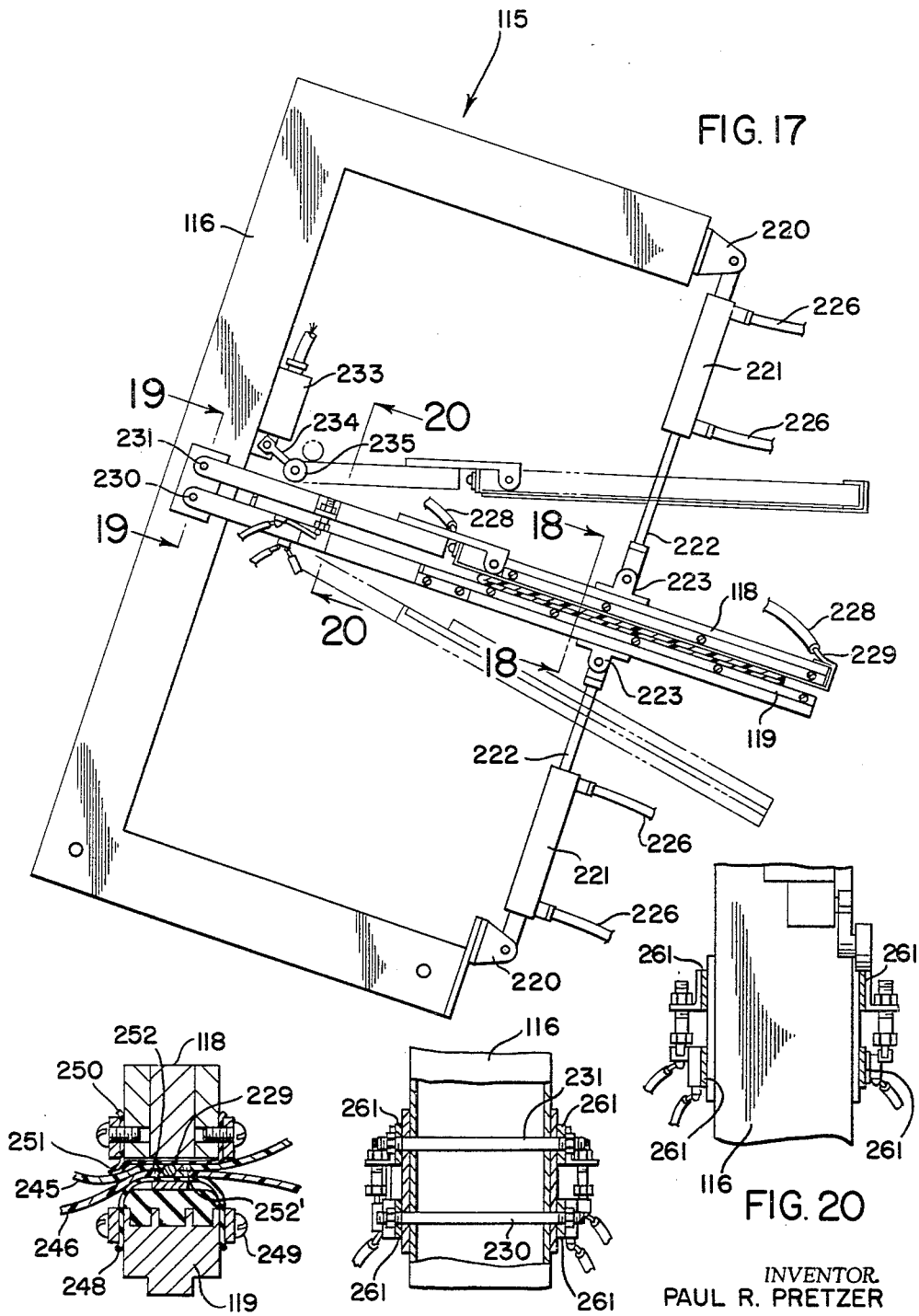

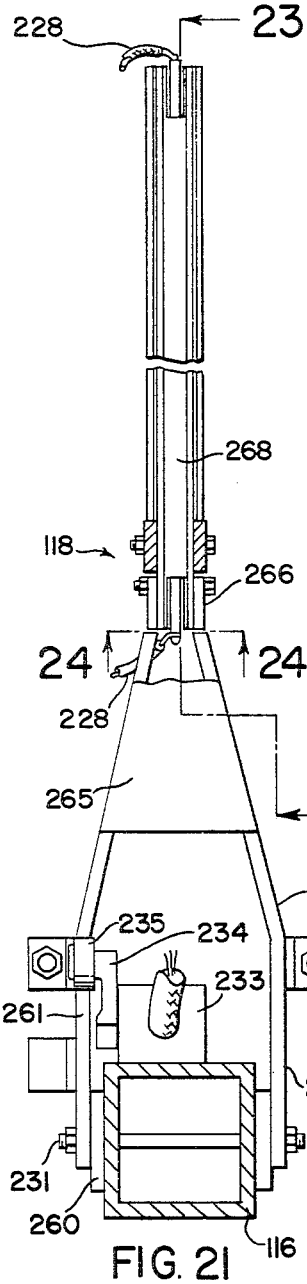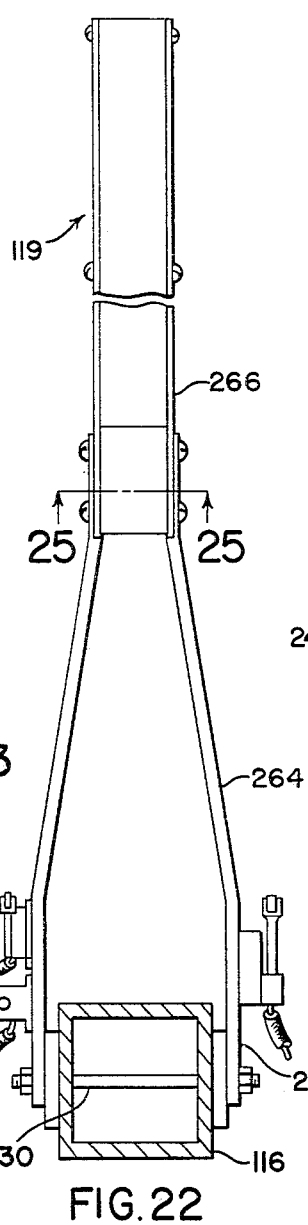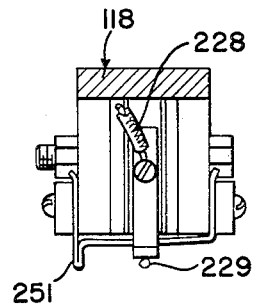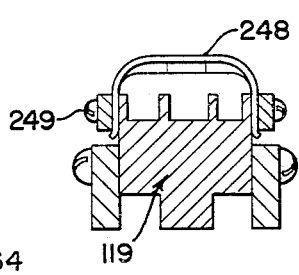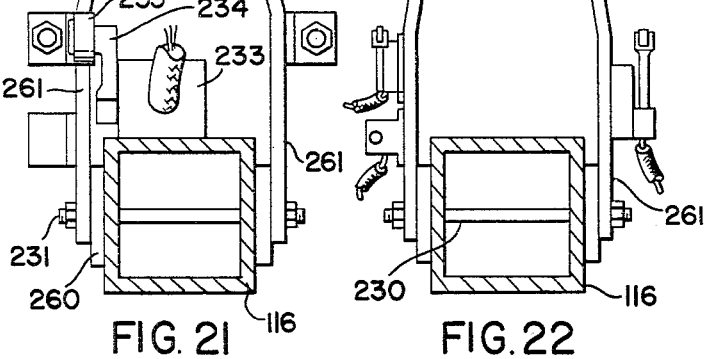

INVENTOR.
PAUL R. PRETZER

INVENTOR.
PAUL R. PRETZER
BY
Fay, Sharpe & Mulholland
ATTORNEYS

United States Patent Office 3,486,290
Patented Dec. 30, 1969

3,486,290
PACKING METHOD AND APPARATUS
Paul R. Pretzer, 826 E. Schaaf Road,
Cleveland, Ohio 44131
Filed Nov. 30, 1967, Ser. No. 692,620
Int. Cl. B65b 9/10, 39/06
U.S. Cl. 53—29
21 Claims

ABSTRACT OF THE DISCLOSURE

A method and apparatus for packaging goods are disclosed wherein a container is formed from a roll of suitable flexible material and goods are inserted into the container for ready shipping. The apparatus includes an elongated frame means for supporting the overall structure. Generally horizontal conveyor means are provided for transferring the goods to be packaged from the inlet of the apparatus into the container. Pusher means are provided in cooperation with the apparatus drive means for assisting the transport of the goods to be packaged. A turret including a plurality of equally-spaced, generally radially outwardly extending tubular components or tubes is mounted at an angle relative to the upper plane of the frame means. The turret is so positioned that a component thereof, which carries a container, indexes to a position for ready receipt of the goods to be packaged. When the goods to be packaged are vegetables, for example, water lubrication may be provided to a generally horizontal feed tube or funnel.

An angularly oriented motor driven roll of container material, for example, oriented polypropylene film, is mounted near the apparatus. Guide bar means are provided in cooperation with the roll to accept the container material from the roll and to double a portion of the roll back upon itself as the initial step in forming the container. The tubes on the turret means are positioned to extend between the folds of the film as it comes from the guide bar means. Jaw means are provided which open and close as the turret means rotate to fuse the folds of the film together at predetermined intervals to form a completed container over the end of the tube means. To achieve this purpose, one of the jaw means includes an intermittently heated wire for periodically fusing the film folds together. Cam-operated fingers are provided to receive the leading edge of the film after each fusing.

Thereupon, the goods to be packaged are moved by the conveyor means into the container on the end of the tubular component of the turret means. As the pusher means achieve the end position on the frame, means are actuated to initiate the indexing of the turret means to the next position. The pusher means may further include means for rotating the paddle of the pusher means through about a 90° turn to permit free fall of the packaged goods to a discharge conveyor. The arrangement of parts so cooperates that as the jaw means heats, a seam on the trailing edge of one container and a seam on the leading edge of the next container is formed. The tubular components on the turret further act to catch the seam on the container to be made and to assist in procuring the film as the turret indexes for the next cycle. The parts as disclosed further cooperate in such a manner that the tension on the lead container is relaxed before the jaw means lock and the wire fires, so that the stretching influence of the jaw means is eliminated.

CROSS REFERENCES TO RELATED APPLICATIONS

This invention is an improvement over the invention described in U.S. Patent No. 2,540,489, in the name of Paul R. Pretzer, for "Packing Machine With Means for Feeding a Bag Over Discharge End of Chute Carrying Vegetables and Common Means for Discharging Vegetables Into Bag and Filled Bag Into Another Chute," issued Feb. 6, 1951.

BACKGROUND OF THE INVENTION

This invention relates to a packaging method and combination apparatus. More particularly, this invention relates to a method and packaging apparatus for automatically transferring goods into a package or container.

More particularly, this invention relates to a method and apparatus for packaging goods, such as vegetables, wherein a container is automatically formed and positioned in cooperation with the elements of the apparatus so that the goods may be transferred into the formed container.

Prior art arrangements for the packaging of goods offer solutions to problems of packaging which are keynoted by a wide variety of approaches. Generally, the most determinative factor in packaging goods is the nature of the goods themselves. When the goods are of the type which may be packaged conveniently in light containers or bags, for example, clear "Cellophane," plastic or other similar flexible materials, problems of a particular nature arise.

One prior art solution to bagging goods in the type of container thus described is the primitive approach of providing a plurality of bags, often purchased from a supplier, receiving the goods individually, and manually transporting the goods to the bags. The filled bag is then transferred to conveying means. However, as is at once apparent, such an approach is highly unsatisfactory, particularly in high speed assembly line types of operations for reasons of lack of speed, efficiency, cost of materials and, of course, the high cost of labor.

A variation of the above approach includes the development of a variety of devices designed to operate in the same mode of approach by either conveniently providing the bags to the operator from some type of automatic delivery device or by means for conveniently providing the goods to the operator in conjunction with his grasp of the bag, and the like. However, for the reasons previously stated, such an approach has likewise been unsatisfactory.

Accordingly, it has long been the desire to provide means for automatically forming the bag from a central supply of bagging material in an automatic fashion.

Such a problem particularly arises in relation to the packaging of goods, such as vegetables. Quite obviously, growers and distributors of vegetables in large quantities seek to accentuate consumer acceptance of the goods by minimizing the time from the picking of the vegetables to their display on the open market. To this end, it is desirable to package the vegetables in neat, attractive, transparent packages for viewing by the potential customer.

A typical approach of the prior art to vegetable packaging is similar to the one previously stated in which vegetables, such as leaf lettuce, cabbage, radishes and the like are brought from the growing area to a packaging area and placed in thin transparent plastic or paper bags wholly by manual effort. This, of course, is costly, as it requires a considerable labor force and delays in delivery to market. Moreover, support mechanisms for this approach to packaging vegetables are also quite costly and complicated.

A typical advance over the general operation is described and claimed in U.S. Patent No. 2,540,489, heretofore mentioned. The invention therein described and claimed relates to a packing machine including means for conveying the goods to be packaged into bags which have been opened and delivered to a receiving position.

The bag, as therein described, may be opened and position either manually or automatically. However, as can be understood, the apparatus therein described requires purchased preformed bags.

To achieve somewhat the same aims, with the problems of the prior art in mind, particularly with reference to the bagging of vegetables, it is desired to provide a method for automatically forming the bag from a central supply of bagging material to effect the reduction in cost, both as to material and labor involved. Thus, the apparatus and method according to the instant invention have been provided.

SUMMARY OF THE INVENTION

The novel apparatus which overcomes the problems of the prior art comprises frame means for supporting the apparatus structure. Feed tube means or funnel means are mounted on the frame means to provide a conduit for the goods to be packaged. Means for water lubricating the feed tube means or funnel means are provided when the goods to be packaged are vegetables. Pusher means are provided for pushing the goods to be packaged through the funnel means. To this end, a plurality of paddle-like structures are provided on a continuous chain loop positioned in accordance with the timing of the apparatus to achieve the desired result.

Turret means are provided which include a plurality of equally spaced, radially outwardly extending tubular components. The turret means are mounted and positioned in a position relative to the upper plane of the frame, so that during the bagging operation, one of the tubes is aligned with the funnel means. Accordingly, the funnel means and the tube on the turret means are aligned to form what appears to be a continuous chute through which the commodity being bagged passes. As the turret means indexes, a different tube is brought into alignment with the funnel to receive the goods being pushed by a subsequent pusher means.

An angularly oriented, motor-driven roll of plastic film, for example, oriented polypropylene, is mounted adjacent the turret means. Guide bar means are provided to receive the film from the roll as the initial part of the container-forming operation. Guide bar means receive the film from the roll in such a manner that the film is doubled back upon itself in a lengthwise direction. In cooperation with the guide bar means, the tubes on the turret are so positioned to extend between the folds of the film.

Jaw means are provided which may be pivoted in such a manner to open and close as the turret means rotates to fuse the folds of the film together at predetermined intervals. The jaw means operate both to fuse the folds of the film from the roll together to form a completed container, which is thus carried over the end of the tube, and to sever the completed container from the film roll.

The jaw means further include an intermittently heated wire which fires periodically. Pivoted, cam operated fingers lie longitudinally along the leading edge of the tube on the turret means to receive the leading edge of the film after each fusing and severing. Thus, means are provided to form simultaneously a seam on the trailing edge of one bag and a seam on the leading edge of the second bag prior to the severing of the one bag from the film roll. Means are further provided to catch the seam on the second bag to carry the material from the roll along with the turret as it indexes for next firing. The various portions of the machine cooperate in such a manner that the timing sequence provides that the finger means on the tube carrying the lead bag releases slightly before the jaw means lock and the wire fires, so that the turret may index to pull the next finger up to catch the web to form the next bag.

Thus, as can be seen, as the turret means indexes and the jaws open and close a bag is formed in the free end of each tube. After the bag is formed, the tube passes over the top of the funnel means and, ultimately, each tube comes into alignment with the funnel. The goods to be packaged are pushed by the pusher or paddle means and pass into the bag carried on the end of such tube.

The driven pusher or paddle means subsequently force the bagged goods from the end of the tube and onto conveyor means. The pusher or paddle means are pivoted in such a manner that, while the plane of the paddle is generally perpendicular to the axis of the funnel, as the paddle emerges from the opening of the tube, it pivots in such a manner that the paddle is generally parallel to the axis of the tube, thus to achieve ready disengagement of the bag from the paddle. This latter described feature overcomes the problem of the commodity tending not to disengage from the pusher or paddle means.

Accordingly, it is an object of this invention to provide an apparatus and method for packaging goods.

It is a further object of this invention to provide a novel and unobvious packaging apparatus and method which overcome the problems of the prior art.

It is a still further object of this invention to provide an apparatus and method for packaging goods in which the goods are conveyed into a package which has been formed by the apparatus.

It is a still further object of this invention to provide means for forming a bag from a roll of material and to position the formed bag for ready receipt of goods to be packaged.

It is still another object of this invention to provide apparatus and method for conveying goods into containers formed from a roll of bagging material by the apparatus.

It is a still further object of this invention to provide means for forming a container, including a roll of material, guide means for guiding the material from the roll, and jaw means for sealing the formed bag for positioning on a component for ready receipt of goods to be packaged.

It is a still further object of this invention to provide means for packaging goods including a conveyor means, turret means including tubular components, and means for forming a bag from a roll of bag material on the tube in such a manner that goods being conveyed are conveyed into the formed container.

These and other objects and advantages of the invention will become readily apparent upon a perusal of the specification and detailed study of the accompanying drawings.

BRIEF DESCRIPTION OF THE DRAWINGS

In the drawings:

FIG. 3 is a side view, partially in section, of a portion of the apparatus shown in FIGS. 1 and 2, illustrating the relationship of the turret means, the pusher means and the funnel means;

FIG. 4 is a sectional view taken along line 4—4 of FIG. 3;

FIG. 5 is a sectional view taken along line 5—5 of FIG. 3;

FIG. 13 is a view taken along line 13—13 of FIG. 10;

FIG. 14 is a view of the cam and finger arrangement in the turret means;

FIG. 15 is a view taken along line 15—15 of FIG. 14;

FIG. 16 is a view taken along line 16—16 of FIG. 15;

FIG. 17 is a plan view of the U-shaped frame member and jaw means;

FIG. 18 is a view taken along line 18—18 of FIG. 17;

FIG. 19 is a view taken along line 19—19 of FIG. 17;

FIG. 20 is a view taken along line 20—20 of FIG. 17;

FIG. 21 is a view of the upper jaw, including the intermittently heated wire;

FIG. 22 is a plan view of the lower jaw;

FIG. 23 is a view taken along line 23—23 of the upper jaw, as shown in FIG. 21;

FIG. 24 is a cross-sectional view taken along line 24—24 of FIG. 21;

FIG. 25 is a view taken along line 25—25 of the lower jaw section as shown in FIG. 22;

Referring now to FIGS. 1 and 2, a combination packaging apparatus according to the invention is disclosed as comprising frame or support means 10, depicted generally in the form of a bench or frame. Support means 10 includes a plurality of base plates 11 in the form of horizontal channels for securing support means to suitable floor or base for supporting the apparatus. A plurality of generally vertical support members 12 and 13 are, respectively, secured to base plates 11 to determine the general overall height and width of support means 10. Horizontal support means 14 may be disposed between vertical members 12 or 13 to provide structural rigidity to the apparatus. The upper edge of the support means 10 comprises a pair of elongated channel members 15 and 16 which are generally co-planar.

Figure 1:
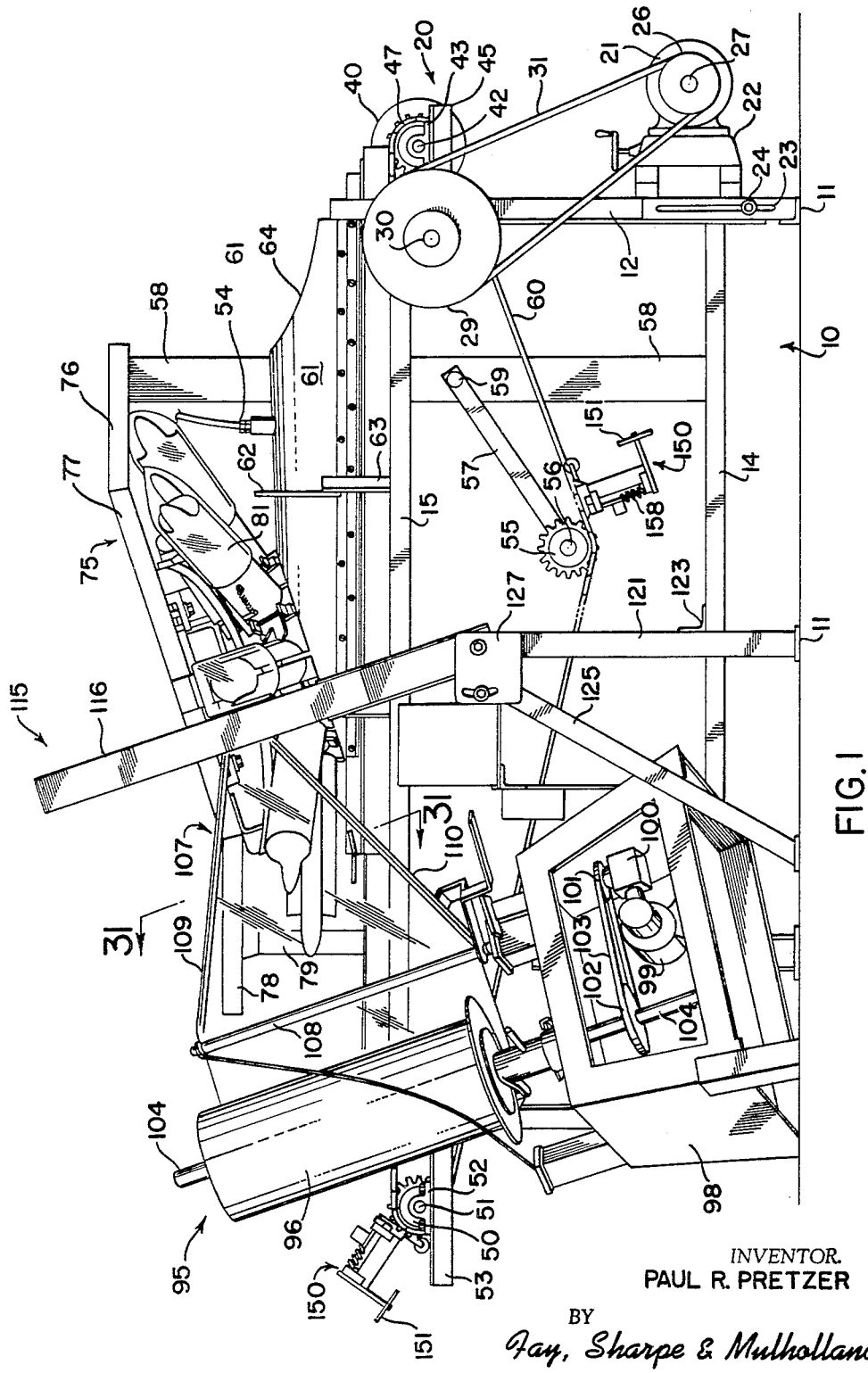
FIG. 1 is a side elevational view of the apparatus according to the invention showing the relationship of the component parts.

Means for converging the goods are shown generally at 20 as including drive motor means 21, secured in housing 22, which is adjustably secured to support means 10 between vertical supports 12 and 13 by way of a flange 23, and locking nut 24 arrangement. It can be understood that loosening of the locking nut 24 in both vertical supports 12 and 13 will permit the ready vertical adjustment of the motor drive means.

Means for reducing the normal motor speed to a speed capable of use in the apparatus is shown in the form of a sprocket 26 rotatably secured to the rotatable shaft 27 on the motor 21. A second sprocket 29 of predetermined diameter is rotatably disposed about shaft 30 and is connected to sprocket 26 via belt drive 31. Journal means 33 (FIGS. 3 and 5) are provided to permit free rotational movement of shaft 30 and to support shaft 30 and the sprocket attached thereto on the frame means, either directly or by way of support channel 35.

Additional gear reduction is provided by means of sprocket 37 secured at the end of shaft 30 opposite sprocket 29. In the embodiment depicted, sprockets 29 and 37 are disposed at a width greater than that defined by top edge channels 15 and 16 to permit a relatively free passageway therebetween, as will be hereinafter discussed.

Sprocket 40, driven by belt means 41 (FIG. 3) in conjunction with sprocket 37, is disposed about shaft 42. Shaft 42 is rotatably secured in journals 43 (FIG. 5).

A driven, toothed sprocket 47 (FIG. 3) is also rotatably disposed on shaft 42 at the position intermediate vertical supports 12 and 13.

An idler sprocket 50 (FIG. 1) is disposed about shaft 51 and journal 52 which is mounted on horizontal support means 53 at the end of the support means 10 opposite the driven sprocket 47. A second idler sprocket 55 of a construction similar to sprockets 47 and 50 is rotatably secured about pin 56 on member 57 which is pivotally secured to upstanding leg 58 at pin 59 to permit rise and fall of sprocket 55 as the tensioning of the system requires or permits.

An endless belt 60 is provided which is capable of entering a meshing engagement with toothed sprockets 47, 50 and 55.

A horizontally disposed feed tube 61 through which articles to be packed are conveyed is secured to upper edge channel 15 by means of a flange-like securing member 62 connected to vertical support 63. The inner and outer contours of feed tube 61 are determined by the nature of the commodity of the goods to be packaged. For example, when the apparatus is utilized for the bagging of leaf lettuce, it is desirable to have a gradually condescending inner contour effectively to bunch the leaf lettuce to a more compact package prior to bagging. On the other hand, if the commodity is a non-contractible item, such as shirts, for example, the contour is so oriented. Similarly, the horizontally disposed feed tube 61 may be of the generally tubular contour having a portion 64 cut away to serve as a receiving apron for the goods to be deposited and conveyed through the tube for bagging.

Means for lubricating the feed tube 61 when conveying vegetables are shown generally at 54.

As can best be seen in FIG. 2, feed tube 61 forms a bifurcated or slot section 65 to form a slot for the passage of the pusher means therethrough, as will be explained hereinafter.

Additional support is provided for the horizontally disposed feed tube by a pair of laterally spaced, vertically extending members 67 to which are attached like channel portions 68 having generally horizontal surfaces formed thereon and forming a slotted space for the passage of pusher means therethrough. Disposed upon the horizontal surface of the channel means 68 are angular members 69 for securing the slot section 65 of the horizontal feed tube. In this manner, a relatively secure structure of the passage of goods may be obtained.

The slot section 65, as hereinbefore described, formed by the bifurcated portion of the feed tube 61, extends along the full length of the feed tube 61.

Turret means are shown generally at 75 (FIG. 3) as including upstanding leg 58, leg 76, inclined support means 77, leg 78, and upstanding vertical leg 79. Elements 76, 77, 78 and 79 form the supporting structure for a plurality of radially outwardly extending tubular components 81. Tubular components 81, in FIGS. 1 and 3, are depicted with the bag formed thereon, as will be explained hereinafter.

As can best be seen in FIG. 3, turret means 75 further comprises axle 83 and hub means, shown generally at 84, including a gearing mechanism for suitable connection to drive means (not shown). Hub means 84 is secured to inclined support means 77 in such a manner that rigidity between member 77 and the turret frame 86 is achieved while yet permitting rotation of axle 83 and the turret frame 86 with respect to member 77.

Frame 86, to which may be secured the tubular components 81, is rotationally attached to hub 84 with suitable bushing or lubrication as needed. Frame 86 is designed so that when tubular components 81 are secured thereto, the relative angle of the tubular components 81 with respect to the axis of the upper edge channel 15 is such to permit passage of tubular components 81 over the feed tube 61 while yet permitting the tubular component 81 to be disposed substantially horizontally when positioned in alignment with the outlet end of feed tube 61.

FIG. 3 shows a tubular component 81a in horizontal, axial alignment with feed tube 61 for receipt of goods into the container formed thereon. Correspondingly, tubular component 81b is shown in a position which has cleared the feed tube 61 and having a container formed thereon for subsequent indexing into axial alignment with feed tube 61 in a position such as tubular component 81a.

The tubular components 81 may be secured to frame 86, so as to overlie one of a plurality of circular openings 88 formed therein. Opening 88 must be of such a configuration and size to permit the goods to pass therethrough and into the inlet end of tubular component 81. As can be seen when considering tubular component 81a of FIG. 3, the inlet end 89 is disposed adjacent the outlet end 90 of feed tube 61 during an article conveying operation. The outer of outlet end 90 of tube 81a is designed to carry the plastic bag 87 with the mouth of the bag surrounding the tubular component 81a.

Film supply means are shown generally at 95 (FIG. 1) as including an angularly oriented, motor driven roll 96 of flexible material, preferably oriented polypropylene. Housing 98 is angularly disposed with respect to the horizontal for proper operative alignment of the roll of material for its subsequent operation. Housing 98 further includes motor 99, gear box 100, and spindles 101 and 102 having a drive belt 103 connected therebetween for rotation of the roll of film 96 about axle 104 during the container forming process.

It can be understood that the gearing and the driving mechanisms of the various components of the machine must be coordinated in such a manner as to permit free movement of the corresponding component parts. In particular, the gearing of the drive means for the roll of flexible material must be such as not to hinder free movement of the film from the roll 96 so as to cause inadvertent delays in the operation, while yet not overdriving to permit bunching of the film.

Film supply means 95 includes a guide bar arrangement shown generally at 107, as comprising a generally triangular side bar arrangement consisting of guide bar members 108, 109 and 110. As can be understood, film from roll 96 passes over guide bar 108 onto guide bars 109 and 110 to be ultimately folded thereupon to form the initial step in the container forming operation. The film may be considered to be doubled back upon itself in this portion of the operation for subsequent sealing to form a bag or container upon a tubular component 81.

Figure 31:
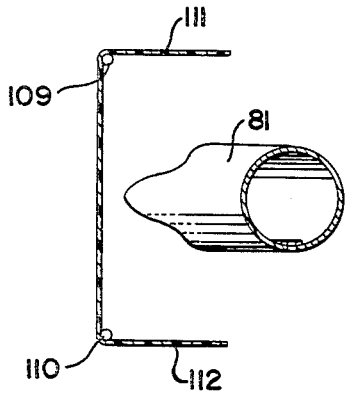
FIG. 31 is a view taken along the line 31—31 of FIG. 1 showing the film doubled back upon itself on guide bars 109, 110.

In FIG. 31 there is shown a view of the film on guide bars 109, 110. It is to be understood that tubular component 81 passes between edges 111, 112 of the film in the container forming operation to be described more fully hereafter.

The container forming apparatus further includes jaw means shown generally at 115 as comprising a generally U-shaped member 116 to which are attached upper jaw segment 118 and lower jaw segment 119. U-shaped member 116 is supported by a frame comprising upstanding members 121 and 122, cooperating and connected with the previously described frame means via horizontally extending member 123 for ultimate securing to frame means 14 of the bench-like structure previously described.

For support, an angularly disposed frame member 125 (FIG. 1) may be provided. Members 125 and 121 cooperate in an adjustable connection block 127 whereby the angular disposition of the U-shaped member 116 may be adjusted.

Figure 2:
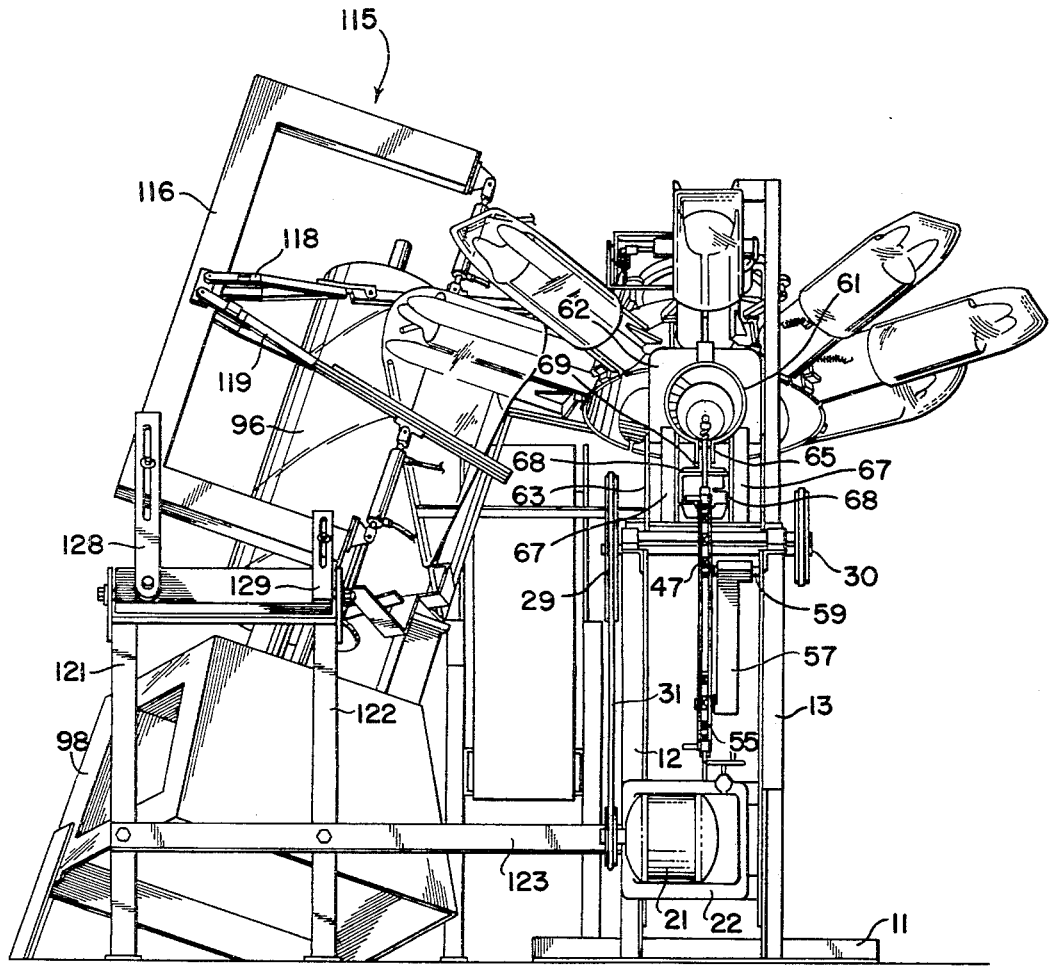
FIG. 2 is an end elevational view of the apparatus according to the invention.

Cooperating with the adjustment means are vertical height control means 128 and 129 shown in FIG. 2 as comprising a slotted member having a nut and bolt arrangement for raising or lowering the U-shaped member 116 as may be needed.

Since the components of the invention have been broadly described, the general operation of the apparatus will now be described.

Figure 10:
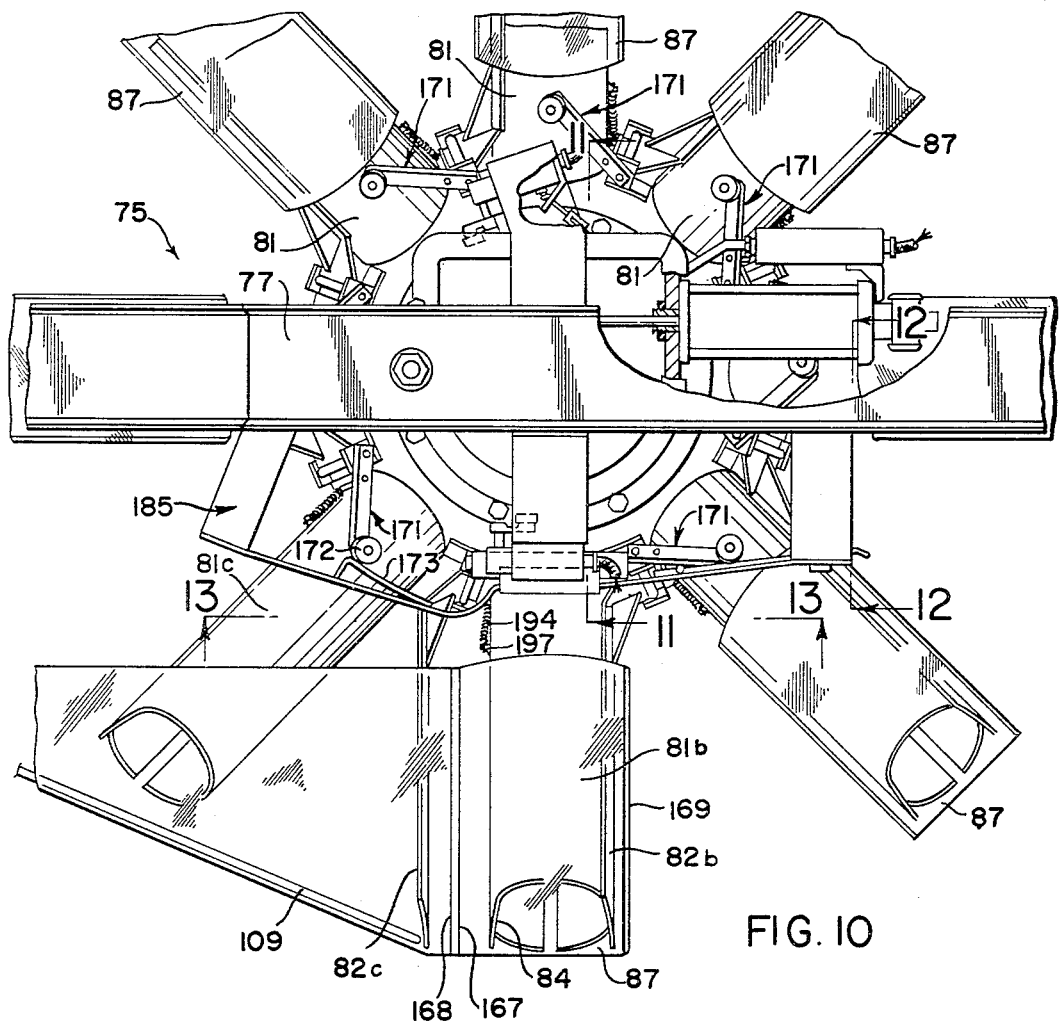
FIG. 10 is a plan view of the turret means showing a tube in relation to the formed container.

Suppose that a commodity to be bagged, such as lettuce, has been placed upon receiving apron 64 of feed tube 61 and is being pushed by pusher means 150 of drive belt 60 to feed tube 61. At a time prior thereto, film has been extracted from roll 96 and has passed across guide bar means 107 and has been doubled back upon itself over guide bars 109 and 110 as shown in FIG. 31. Simultaneously therewith, the turret is moving so that a tubular component 81 on the turret is positioned so as to extend between the folds of the film as shown in FIG. 31. After being positioned therein, the jaw segments 118 and 119 close to fuse the folds of the film together. Since the jaws are provided with an intermittently heated wire, as will be explained hereinafter, the film is both fused and severed to form a bag seam 169 (FIG. 10) which is disposed adjacent a tubular component. After release of the jaw segments 118, 119, the turret indexes and additional film is unrolled from roll 96. The jaw segments 118, 119 then close again to fuse the folds of the film together to form a seam 167 (FIG. 10) at a predetermined interval from the previously formed seam 169 (FIG. 10). As previously described, the jaw segments 118, 119 both fuse and sever the film. As shown in FIG. 10, a finger 82c adjacent tubular component 81c serves to support the free edge and seam 168 immediately after becoming severed from seam 167. The operation of finger 82c will be described more fully hereafter. A bag is thus formed on tubular component 81b and is carried on the end of the component throughout a cycle of indexing until the component comes into alignment with the feed tube 61. Accordingly, pusher means 150 push the goods into the bag and pivot away from the bagged commodity, as will be explained hereinafter, to form a prepackaged material.

FIG. 4 is a view taken along line 4—4 of FIG. 3 partially in section. Vertically extending leg 131 is secured to support 78. Guide block 132 is pivotally secured via attachment means 133 to vertically extending leg 131. Guide block 132, because of its mass, serves to provide some smoothing of the bag 87 and lateral extension thereof as the goods are pushed thereinto. Cross section 87 of FIG. 4 illustrates approximately the shape of the bag formed on the tubular component 81a.

FIG. 4 further illustrates positioning of trip switch means 137 which is actuated by the pusher arm, as will be described hereinafter, to initiate the indexing of the turret. When pusher means 150 have gone thus far, the device is actuated to advance the positioning of a tubular component 81 and its horizontal relationship to feed tube 61 as hereinbefore described.

FIG. 5 is a view, partially in cross-section, taken along line 5—5 of FIG. 3, which shows the relationship of the pusher means 150 within the feed tube 61. During operation, the pusher means would be pushing or driving a commodity to be packaged to the tubular component 81 which is in horizontal alignment with the feed tube 61.

A plurality of pusher means 150 are shown in FIG. 1 and are fixedly secured to endless belt 60 for rotation therewith. The selection of the number of pusher devices 150 is selected in coordination with the desired capabilities of the system. As can be understood, each pusher means 150 drives a commodity into the formed bag so that the timing is largely a matter of choice according to the needs of the operator and the type of commodity employed. Other factors which determine the selection of the number of pusher means are the overall length of the apparatus, the speed of the belt and the rate at which items to be packaged are supplied to apron 64 of the feed tube 61.

Pusher means 150 are so arranged that a generally planar circular paddle 151 travels in a plane generally perpendicular to the endless belt 60. At a predetermined time, as will be discussed hereinafter, the arrangement permits the paddle 151 to "flip" into a position generally parallel with the plane of the endless belt so that the effect is that the pusher means "drops away" from the commodity being packaged. This "flipping" action serves to "throw" the containers with the goods enveloped away from the paddle 151.

Figure 6:
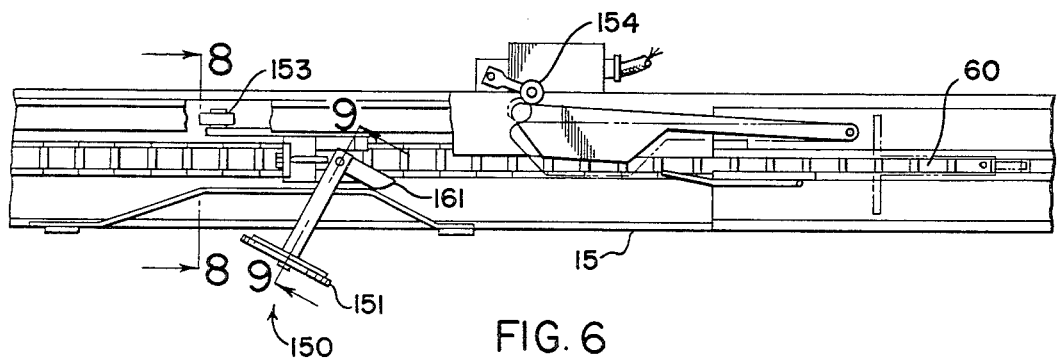
FIG. 6 is a view taken along line 6—6 of FIG. 3.
Figure 7:
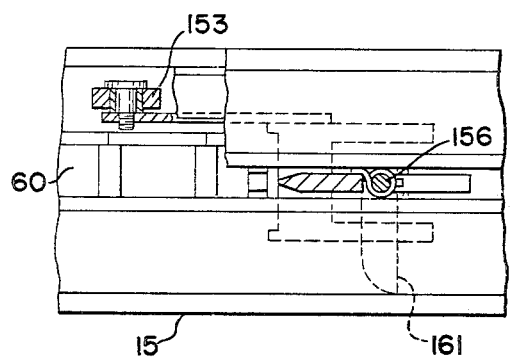
FIG. 7 is a view taken along line 7—7 of FIG. 3.
Figure 8:
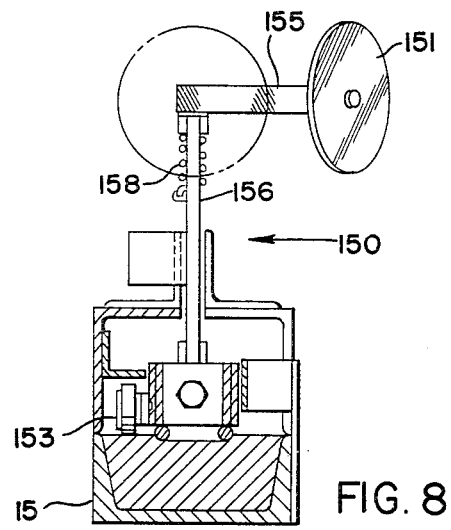
FIG. 8 is a view taken along line 8—8 of FIG. 6.

As can best be seen by FIGS. 6, 7 and 8, and as heretofore mentioned, each pusher device is equipped with a cam follower arrangement 153 for actuating the switch mechanism 154 on the frame means for indexing of the turret.

Paddle 151 is connected through suitable connector means 155 which is rotationally connected to shaft 156 and spring biased by spring 158 in its normal position, or generally perpendicular to the plane of the endless belt 60 as shown in FIG. 3. Since the mechanical connection of paddle 151, connector 155 and shaft 156 permits freedom of rotation, as can be seen by the phantom outline in FIG. 8, a rotation away from its normal position may be achieved.

As can be seen in FIG. 6, the frame means is equipped with a cam track 160 of suitable construction which engages arm 161 on the pusher means 150 as it is driven in cooperation with endless belt 60. It can be understood that the positioning and contour of the cam track 160 is such that insertion of the commodity into the preformed bag is achieved before paddle 151 is diverted from its normal position. After the blade has fallen away from the commodity, and the paddle has traveled the contour of the belt to the lower position, as can be seen in FIG. 1, the paddle 151 is restored to its normal position by action of the spring bias 158.

Figure 9:
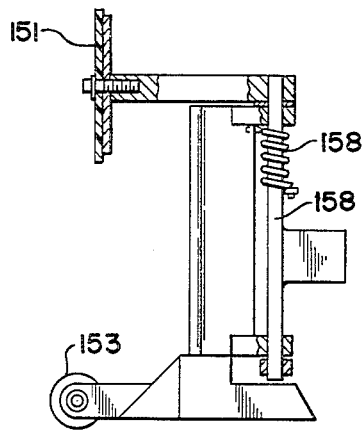
FIG. 9 is a view taken along line 9—9 of FIG. 6 illustrating a portion of the pusher means.

FIGS. 7 and 9 depict typical construction of the idler 153 and of the mounting of the spring biasing means 158 on the shaft 156. It can be understood, however, that other convenient and equivalent mechanical structures may be used to achieve the same effect.

FIG. 10 is a view in greater detail of turret means 175 in relation to the container forming and disposing operation. As can be seen, a plurality of tubular components 81 of the turret means have completed container or bag 87 formed thereon. Tubular component 81b is illustrated in the position where it has intercepted the film from the film supply 96 and after the time at which the jaws have fired to form a seam 167. Tubular components 81c is simultaneously moving into position to intercept the film edge and seam 168 which have been doubled over the guide means 109 as has been previously described. It can be understood that the trailing seam 167 of formed bag 87 of tubular component 81b also forms the leading seam 168 of the bag which will ultimately be formed on tubular component 81c as jaw segments 118, 119 formed simultaneously the seams 167, 168 and thereafter severed the film thereby to define the individual seams 167, 168.

Each of the tubular components 81 is provided with an idler cam means 171 to activate a respective finger 82. As heretofore described with reference to FIG. 10, the jaw segments 118, 119 form seams 167 and 168 and thereafter sever the film. In order to prevent the leading edge or seam 168 of the film from falling under the influence of gravity, there is provided a finger 82c (FIG. 10) in order to support the leading edge 168 of the film as the turret 75 indexes and the tubular component 81c rotates in a counterclockwise direction to assume the position formerly occupied by tubular component 81b. Finger 82c is activated by the idler cam means 171 and reference will now be made to FIGS. 10, 13, 14, 15 and 16 for a more complete description of this mechanism.

In FIG. 13, there is shown the turret frame 86 with the tubular components thereof omitted in the interest of clarity. Openings 88 are defined in the turret frame 86 and it is to be understood that the tubular components 81 extend radially outwardly from the frame 86 so as to overlie the respective openings 88. Pivotally secured to the frame 86 are a plurality of fingers 82 associated with each of the tubular components. Fingers 82 are generally concave in section so as to be complementary to the exterior surface of the tubular components 81. Reference is made to FIG. 10 wherein there is shown finger 82b in place adjacent tubular component 81b. It should be understood that a single finger 82 is associated with each of the tubular components and that the projection 84 extending from each of the tubular components (FIG. 10) is an integral part of the respective tubular components.

Returning now to FIG. 13, each of the fingers 82 is secured to a respective flare portion 202. An angular support means 203 or web may be provided if desired. Secured to the face of the turret frame 86 is a pivot plate 180 having a pair of upturned flange members 181. Flare portion 202 is disposed between the upturned flange members 181 and is pivoted to these members by means of pin 193.

As shown in FIG. 16, a pair of cap screws 200 may be used to secure the pivot plate 180 to the turret frame 86. Idler arm 171 is fixedly secured to pin 193 and is free to rotate therewith. A pin 194 is connected to idler arm 171 for attachment of spring bias means 195. Idler pulley 172 is rotatable about member 196 which is generally perpendicular to the idler arm 171. A bolt 205 and bushing 205 may be used in connecting idler pulley 172 to member 196. It is to be thus understood that the finger 82, flared portion 202, idler arm 171, member 196 and idler pulley 172 function as a rigid linkage, being pivoted at flange 181. Thus, by depressing the idler pulley 172, the finger can be brought into and out of engagement with the tubular component 81.

As is shown in FIG. 14, one end of spring 195 is secured to pin 194. The outer or free end of spring 195 is secured to a shoulder 197 of the tubular component 81.

Reference is made to FIG. 10 wherein the spring 194 is shown attached to shoulder 197. It is thus to be understood that under the bias of spring 195, finger 82 is normally adjacent tubular component 81. Finger 82b of FIG. 10 illustrates the normal position of the fingers.

Idler arms 171 function to position fingers 82 so as support the film during the container forming process. To accomplish the foregoing, a cam track 185 (FIG. 10) is provided immediately above the turret and depending from support member 77. Cam track 185 is provided with run portions 173 for the purpose of guiding the idler pulley 172 of each of the idler arms 171 as the turret indexes. Thus, as is shown in FIG. 10, the idler pulley 172 of tubular component 81c has engaged the cam track 185 thereby to bias outwardly finger 82c to the position shown. Thus, as seams 167, 168 are formed in the film by means of the jaw segments 118, 119 and the film is thereafter served, the seam 168 will be supported by the finger 82c as the turret indexes and the tubular component 81c moves in a counterclockwise direction to assume the position previously occupied by tubular component 81b. As tubular component 81c moves toward the new position, finger 82c will join tubular component 81c and adjacent finger 82d (not shown) will assume the position previously occupied by finger 82c. Thus, a finger 82 is provided by each tubular component 81 as the component is indexed into position to receive a container thereon.

Figure 11:
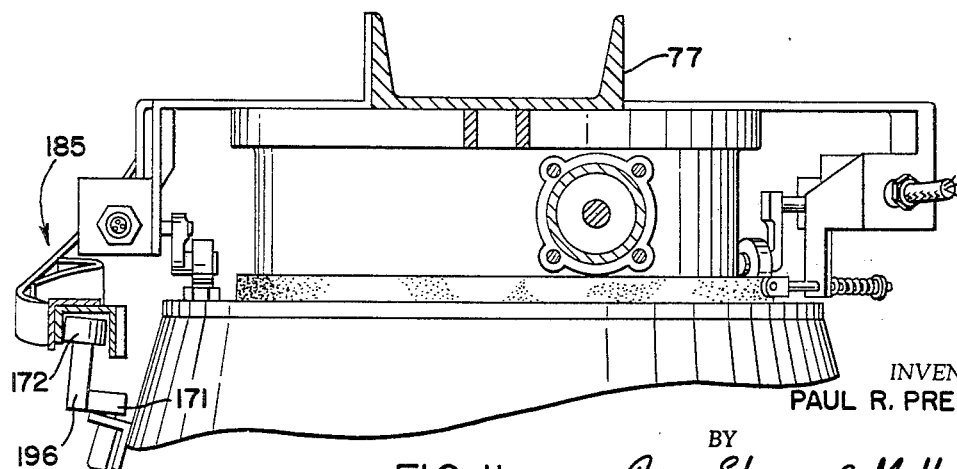
FIG. 11 is a view taken along line 11—11 of FIG. 10.

In FIG. 11, there is shown a view of the supporting member 77 with the cam track depending therefrom.

Figure 12:
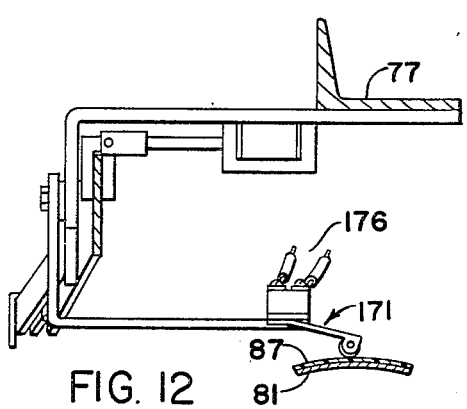
FIG. 12 is a view taken along line 12—12 of FIG. 10.

As shown in FIG. 12, a limit switch 171 depending from support members secured to member 77 may be used to signal indexing of the turret as tubular component 81 with a bag 87 positioned thereon activates the limit switch 171 and the associated electrical circuit 176.

Briefly summarized, cam track 185 with run portions 173 provides for the positioning of fingers 82 to support the film as shown in FIG. 10. Depending on the type of flexible material being used, it may be desirable to orient the cam track in such a manner to provide for the release of the finger 82 just prior to the locking of the jaw segments. In this manner, pressure on the film is relieved which would otherwise cause stretching of the film as the jaw segments close.

FIG. 17 is a view in greater detail of the structure of the jaw segment means 116 which provides the function of sealing and severing the leading and trailing edges of the bags which are formed on the tubular components 81 of the turret means 75. The sealing means comprise a generally U-shaped member 116 having at the outer portions of the legs thereof brackets 220 secured thereto. Solenoid means 221 are suitably connected to bracket 220 and include a variable positionable bar 222 which, in turn, is secured to a pivotal connection 223 to the upper and lower jaws 118, 119 of the jaw means, respectively. Circuit connections 226 are provided to the solenoid means 221 so that upon receipt of energizing current element 222 is drawn, by a magnetic force, into solenoid means 221 to achieve the opening and closing of the jaw means.

The closed positions of upper jaw 118 and lower jaw 119 are shown in the solid outline, while the open positions thereof are shown in phantom outline. In addition circuit lead 228, having the hot wire 229, is shown as secured to upper jaw 118. Jaws 118 and 119 are pivoted about pins 230 and 231, respectively. In addition, secured to the inner surface of the base leg of the U-shaped member is a switch means 233 including arm 234 and follower 235. Upon receipt of the desired command, solenoid means 221 are actuated to cause the jaws to achieve their closed position. Movement of arm 234 and follower 235 thereon from the position denoted in the phantom outline to the position noted in the solid outline, actuates switch 233 to send the signal circuitry to release the active electrical actuation of solenoid means 221 so that the cycle is then ready to repeat itself.

FIG. 18 is a cross-sectional view of the upper jaw 118 containing the wire 229 and lower jaw 119 in the closed position wherein the wire has become heated due to the passage of electrical current therethrough, causing the sealing of the respective surfaces 245 and 246 of the film which had heretofore been provided and doubled over itself as previously described. It can be seen that the sealing and separation is conveniently formed in a single operation. Lower jaw 119 has a cap element 248 secured thereto as by bolts 249 for convenient passage of the folds of the film 245 and 246 thereon.

Similarly, upper jaw 118 has a cap-like element 250 which includes a protrusion 251 to assist in positioning the upper layer of film 245 adjacent the lower layer of film 246 so that a secure seal may be formed as at 252, 252' thereon, on either side of the wire 229. The hot wire 229 thus serves both to fuse the film on either side of the wire and to sever the film.

FIGS. 19 and 20 show in greater detail the construction of the pivot pins 230, 231 of the jaw segments and the legs 261 which comprise the upper and lower jaw segments 118, 119.

FIGS. 24 and 25 depict in greater detail a cross-sectional structure of upper jaw 118 and lower jaw 119.

FIG. 21 is a view in greater detail of upper jaw 118. As illustrated, the base leg 116 of the U-shaped member is of a generally rectangular, thin-walled section having a pin 231 therethrough. Upper jaw 118 includes a pair of generally parallel leg members 261 which are pivotally secured about pin 231 at either side of the base leg 116. Antifriction devices, such as washers, are shown at 260. Switch means 233 is illustrated as fixedly secured to U-shaped member 116. Cam 235 on leg 234 is illustrated and is capable of engagement of one of the generally parallel extending leg members 261 when the upper jaw segment is in its opened position. Thus, the switch means is a normally closed switch. Generally parallel extending leg members 261 converge, as a 264 which may further include suitable reinforcement 265, to a pair of generally parallel extending members 266. Interposed between parallel members 266 is a block of insulating material 268 to which is secured the leads to provide the hot wire connection to perform the sealing operation.

FIG. 22 illustrates lower jaw 119 as being similarly constructed with the exception that the lower jaw need not be provided with insulating members because of the absence of electrical connection for a hot wire arrangement thereon.

FIG. 23 is a cross-sectional view of upper jaw 118 taken along line 23—23 of FIG. 21 and illustrates nonconductive member 268 as being electrically insulated from members 264 and 266.

Figure 26:
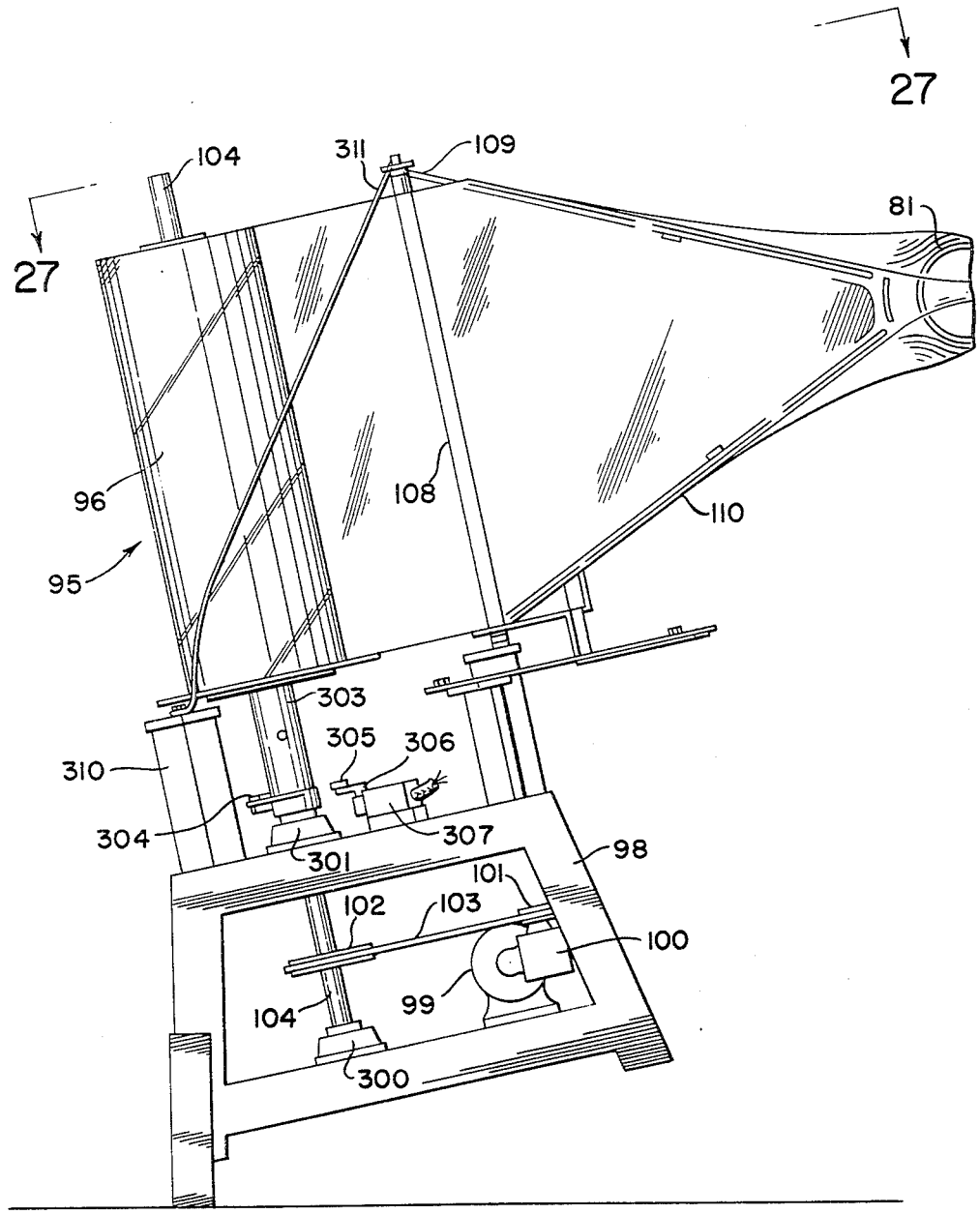
FIG. 26 is a view of the turret arrangement, roll of container material, and the guide means.

FIG. 26 is a view in greater detail of a portion of the components of the bag forming and supply means 95. The components illustrated have generally been discussed in connection with FIG. 1 and, accordingly, will not be repeated here. It can be noted that shaft 104 is secured in bearing means 300 which are generally secured to a portion of the housing 98. Shaft 104 extends through housing 98 as illustrated at 301 as through a journal 301. A sleeve 303 is secured to shaft 104. Sleeve 303 includes a radially outwardly projecting portion 304 to engage follower 305 connected to arm 306 of switch 307. The electrical circuitry is as such that during the time the turret is indexing the film is being provided from roll 96 to the folded over guide means 109 and 110 so that a seam is intercepted by one of the tubular components 81 to form a bag as heretofore described. It can be understood that the supply of film for a bag formation must be coordinated with the indexing of the turret to prevent inadvertent backing up of the film. Upstanding member 310 is also secured to the housing 98. Tensioning means 311 is secured to arm 108 and to upstanding member 310 to provide additional resistance to the unrolling of the film from its roll 96.

Figure 27:
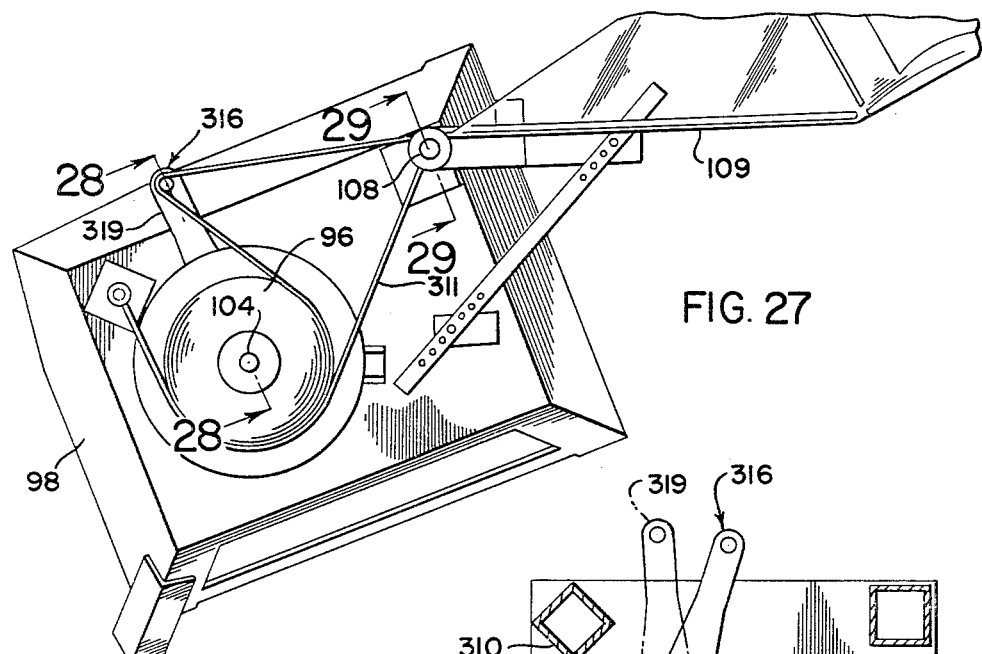
FIG. 27 is a view taken from position 27—27 of FIG. 26.

FIG. 27 is a view taken along line 27—27 of FIG. 26 showing the manner in which the film unwinds from roll 96. The film is withdrawn tangentially from the roll 96 and is drawn about feel switch 316. The purpose of feel switch 316 is to sense when the tautness of the film is too great, such as would be likely to cause rupture of the film and disrupture of the orderly bag making process. Conversely, feel switch 316 could sense the absence of film, such as would indicate the end of a roll. As can be understood, various adjustments in size of the bag may be necessary and, accordingly, the affected elements, such as guide bars 108, 109, 110 must be adjusted appropriately.

Figure 30:
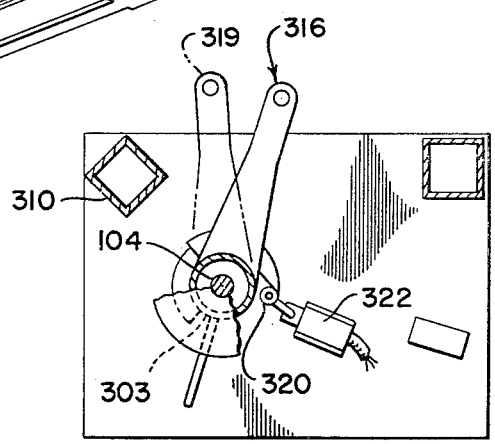
FIG. 30 is a cross-sectional view taken along line 30—30 of FIG. 28.
Figure 28:
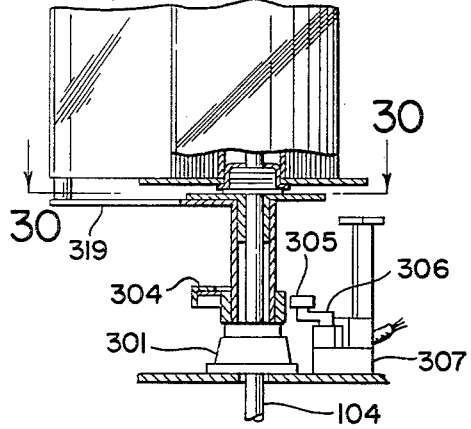
FIG. 28 is a cross-sectional view taken along line 28—28 of FIG. 27.

FIG. 28 is a view partially in section taken along line 28—28 of FIG. 27 showing the roll is rotatable about shaft 104 supplying film over the feel switch 316. Feel switch 316 comprises a vertically extending rod 318 over which passes the roll of film. Rod 318 is connected via connector link 319. As can best be seen in FIG. 30, wherein the phantom outline shows the feel switch 316 in its normal position, undue tensioning of the film causes the link 319 to be diverted to the position shown by a solid line for ultimate actuation of cam follower 320 on switch 322. Thus, in the event of undue tension on the film, the apparatus may be shut down.

Figure 29:
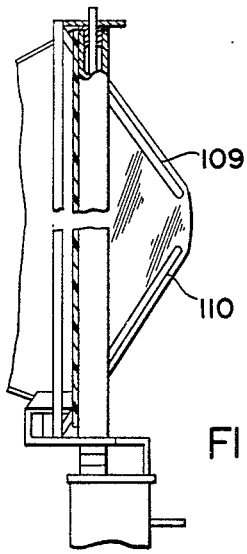
FIG. 29 is a cross-sectional view taken along line 29—29 of FIG. 27.

FIG. 29 shows a view in greater detail of the roll of film as it is being supplied to shaft 108 after which it is folded gently over bars 109 and 110 for alternate formation to a bag.

Figure 32:
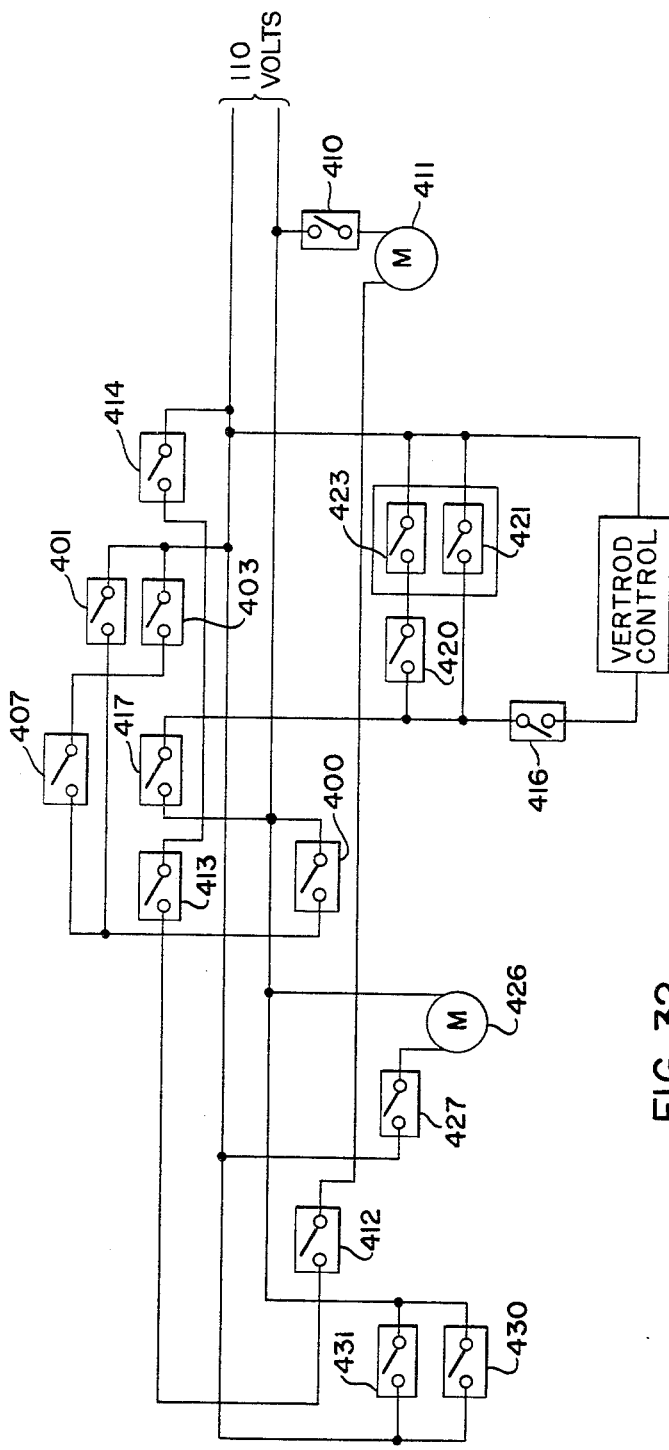
FIG. 32 is an elementary wiring diagram of the circuit of the apparatus of this invention.

FIG. 32 is an elementary wiring diagram of the circuit employed in the apparatus of this invention.

Switch 410 is a conventional "on-off" switch for motor 411. Motor 411 of FIG. 32 equates to the drive motor 21 of FIG. 1, providing motive power for the endless belt 60 and the pusher means 150. A pair of safety stop switches 412 and 413 are provided in the drive motor circuit. An emergency stop switch 414 is connected in series with the drive motor circuit. Switch 427 of FIG. 32 is the rolled film dispenser motor start switch controlling power to motor 426. Motor 426 of FIG. 32 equates to the film roll drive motor 99 of FIG. 1. Switch 400 of FIG. 32 is the turret switch for indexing the turret. This switch is shown as switch 154 in FIG. 6. When the paddle 151 pushing the commodity to be bagged clears the bag holder, the turret switch is activated by member 152 (FIG. 6) to thus index the turret to the next position. Switches 401, 403 and 407 of FIG. 32 are turret switches regulating the indexing thereof. As soon as the turret has completed its index turn, the jaw segments are activated by means of switch 417. Switch 420 of FIG. 32 is a safety switch in the jaw mechanism. Switches 421 and 423 are the down and return switches in the jaw mechanism corresponding to switch 233 of FIG. 17. Switches 430 and 431 are the solenoid arm control switches controlling the movement of the upper and lower jaw segments. Power to the firing wire 229 of the upper jaw segment 118 is controlled by means of switch 416.

The elementary wiring diagram of FIG. 32 has been briefly described in order to show the relationship of the various switches of the apparatus of this invention in the control thereof. Variations in the control as described with reference to FIG. 32 are possible depending upon the type of product to be packaged.

Thus far, the apparatus of this invention has been described with reference to the preferred embodiment thereof.

This invention is further directed to a method of packaging goods in a flexible container.

The method of this invention broadly includes the steps of:
(a) Conveying goods to be packaged to a loading component having an open end,
(b) Forming a container about said component adjacent said open end from a continuous roll of flexible material, and
(c) Depositing the goods to be packaged into said container by moving said goods through said open end of said loading component.

More particularly, the method of this invention comprises the steps of:
(a) Conveying goods to be packaged into a feed tube and thereafter into one of a plurality of tubular components mounted on a turret, said one tubular component being aligned with said feed tube,
(b) Causing a roll of flexible material to release a predetermined length of material,
(c) Forming the flexible material by folding said material so that a first portion thereof is positioned adjacent a second portion thereof,
(d) Fusing said first and second portions of said flexible material together to form a seam and thereafter severing the seam to define a leading seam and a trailing seam in the flexible material,
(e) Intercepting said flexible material with a tubular component of the turret so that said tubular component is disposed between said first and second portions of said flexible material with said leading seam positioned adjacent a first side of said tubular component,
(f) Fusing said first and second portions of said flexible material together to form a seam adjacent a second side of said tubular component opposite said first side of said tubular component, whereby a container is formed on said tubular component.
(g) Severing said container from the roll of said flexible material,
(h) Rotating the tubular component with the container disposed thereabout into alignment with said feed tube, and
(i) Conveying the goods to be packaged through the tubular component aligned with the feed tube and into the container disposed thereabout.

For ease of description, the principles of the invention have been set forth in connection with but a single illustrated embodiment. It is not my intention that the illustrated embodiment nor the terminology employed in describing it be limiting inasmuch as variations in these may be made without departing from the spirit of the invention. Rather, I desire to be restricted only by the scope of the appended claims.

I claim:
1. Means for forming and filling a flexible container comprising the apparatus combination of:
conveyor means for periodically providing goods to be contained,
supply means for periodically providing a continuous supply of flexible material to be formed into a container,
forming means for forming said flexible material into a container, said forming means including positioning means for positioning a first portion of said flexible material adjacent a second portion thereof, and securing means for securing said first portion of said flexible material to said second portion thereof to form a container,
transfer means for intercepting said flexible material and, after said container has been formed, for locating said container in position for receipt of said commodity to be contained,
and pusher means for inserting said commodity into said container.

2. The apparatus combination as defined in claim 1 wherein said conveyor means includes:
elongated frame means including a first portion and a second portion,
an endless belt for conveying a commodity to be contained from said first portion to said second portion of said frame means, and
means for driving said endless belt so that movement thereof causes said commodity to be thus conveyed.

3. The apparatus combination of claim 2 wherein said transfer means includes:
a turret,
said turret including a plurality of radially outwardly extending components,
said components being arranged to intercept said flexible material while said container is being formed,
said turret further being capable of rotation so that a formed container is moved generally in a path defined approximately by an arc of a circle to a position adjacent said second portion of said frame means for receiving said commodity.

4. The apparatus combination of claim 2 wherein said conveyor means further includes a feed tube for the commodity to be conveyed mounted on said elongated frame means.

5. The apparatus combination of claim 4 wherein said feed tube includes means for lubricating said feed tube with water.

6. The apparatus combination of claim 1 wherein said supply means includes:
a generally cylindrical roll of flexible material, and
means for causing said roll to release a predetermined length of said flexible material synchronously with the requirements of said forming means and said transfer means.

7. The apparatus combination of claim 6 wherein said supply means further includes means for sensing the tension in said flexible material and terminating operation of said conveyor means in the event that said tension exceeds a predetermined level.

8. The apparatus combination of claim 1 wherein said forming means includes:
guide bar means for receiving said flexible material and generally folding said flexible material so that a first portion thereof is positioned adjacent a second portion thereof.

9. The apparatus combination of claim 8 wherein said transfer means includes:
a turret,
said turret including a plurality of radially outwardly extending components,
said turret further being capable of rotation so that said component intercepts said flexible material while folded.

10. The apparatus combination of claim 8 wherein said guide bar means is defined by a generally triangular structure, including:
a base and two legs,
said base of said structure being positioned to receive said flexible material and said legs being so arranged that a first portion of said flexible material passes over a first leg and a second portion of said flexible material passes over a second leg,
said first and second portions being positioned adjacent one another near the apex of said triangular structure.

11. The apparatus combination of claim 1 wherein said securing means comprises:
holding means for retaining said first portion of said flexible material adjacent said second portion thereof, and
fusing means for fusing said first and second portions of said flexible material together to form a seam.

12. The apparatus combination of claim 11 wherein said transfer means include:
a turret,
said turret including a plurality of radially outwardly extending components,
said turret being capable of rotation so that said component intercepts said flexible material while a first portion thereof is being positioned adjacent a second portion thereof,
said securing means forming the trailing edge of a formed container on said component, the leading edge of said formed container having been formed when the trailing edge of the immediately preceding container was formed and the flexible material was severed.

13. The apparatus of claim 12 wherein finger means are provided at each of said extending components to support said flexible material during the forming operation.

14. The apparatus of claim 13 wherein said finger means comprises a pivoted elongated element actuated by idler arm means contacting a cam track adjacent said turret.

15. The apparatus combination of claim 11 wherein said holding means includes a pair of pivoted jaw segments arranged to secure said flexible material at predetermined intervals.

16. The apparatus combination of claim 15 wherein said fusing means comprises an intermittently heated wire which, when heated, acts to fuse said first portion of said flexible material and said second portion thereof together.

17. The apparatus combination of claim 16 wherein said intermittently heated wire is mounted on one of said jaws.

18. The apparatus combination of claim 1 wherein said transfer means includes:
a turret,
said turret including a plurality of radially outwardly extending components,
said components being arranged to intercept said flexible material while said container is being formed.

19. The combination apparatus of claim 1 wherein said pusher means are secured to a portion of said conveyor means for movement therewith.

20. The apparatus combination of claim 19 wherein said pusher means further includes means for diverting a portion of said pusher means from said goods when said goods have been inserted into said container.

21. The method of packaging goods comprising the steps of:
(a) conveying goods to be packaged into a feed tube and thereafter into one of a plurality of tubular components mounted on a turret, said one tubular component being aligned with said feed tube,
(b) causing a roll of flexible material to release a predetermined length of material,
(c) forming the flexible material by folding said material so that a first portion thereof is positioned adjacent a second portion thereof,
(d) fusing said first and second portions of said flexible material together to form a seam and thereafter severing the seam to define a leading seam and a trailing seam in the flexible material,
(e) intercepting said flexible material with a tubular component of the turret so that said tubular component is disposed between said first and second portions of said flexible material with said leading seam positioned adjacent a first side of said tubular component,
(f) fusing said first and second portions of said flexible material together to form a seam adjacent a second side of said tubular component opposite said first side of said tubular component, whereby a container is formed on said tubular component,
(g) severing said container from the roll of said flexible material,
(h) rotating the tubular component with the container disposed thereabout into alignment with said feed tube, and
(i) conveying the goods to be packaged through the tubular component aligned with the feed tube and into the container disposed thereabout.

References Cited

UNITED STATES PATENTS

| 2,747,346 | 5/1956 | Tigerman et al. | 53—28 |
| 2,951,322 | 9/1960 | Wood | 53—192 X |
| 3,382,644 | 5/1968 | Vogt | 53—29 |

TRAVIS S. McGEHEE, Primary Examiner

U.S. Cl. X.R.

53—192